May 30, 1939.  A. J. McCONNELL  2,160,599
PROTECTIVE APPARATUS
Filed Nov. 30, 1938   3 Sheets-Sheet 2
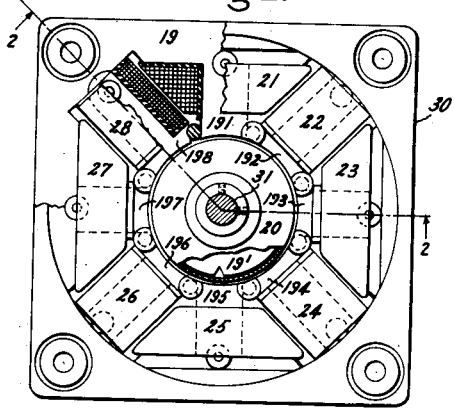
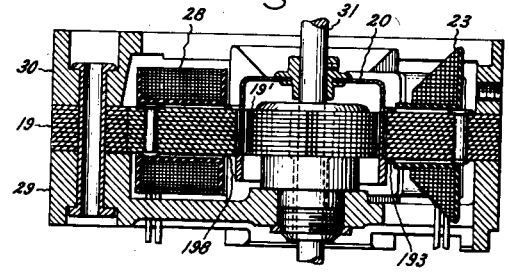
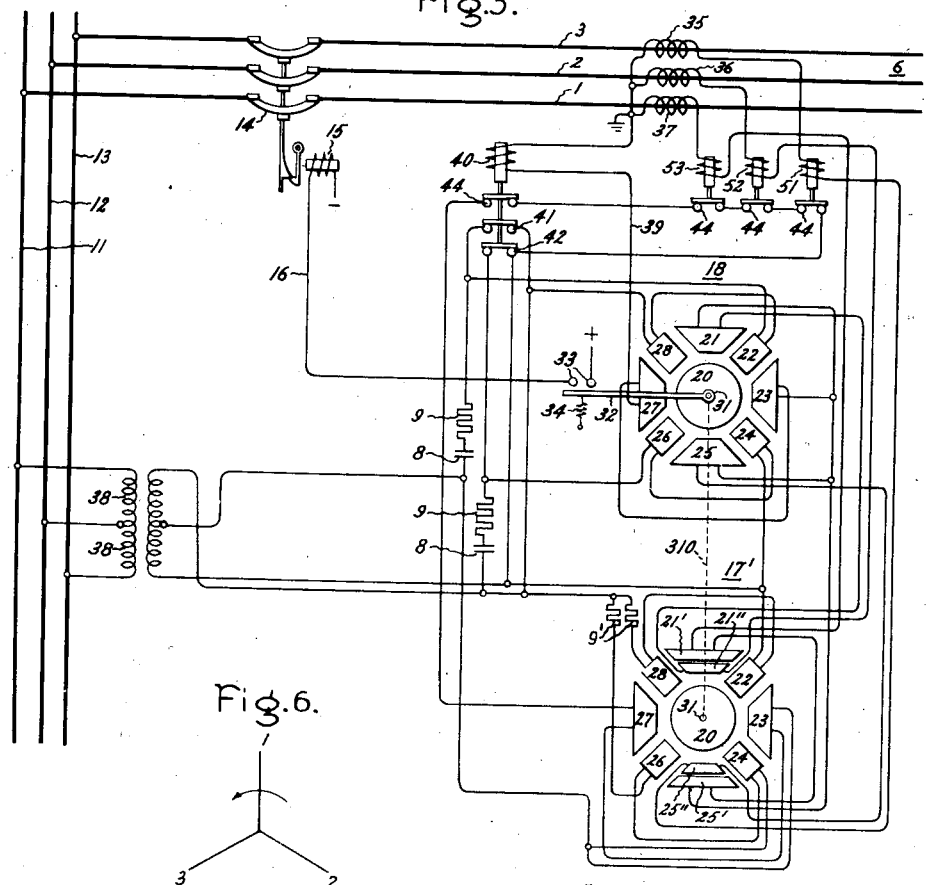
Inventor:
Andrew J. McConnell,
by Harry E. Dunham
His Attorney.

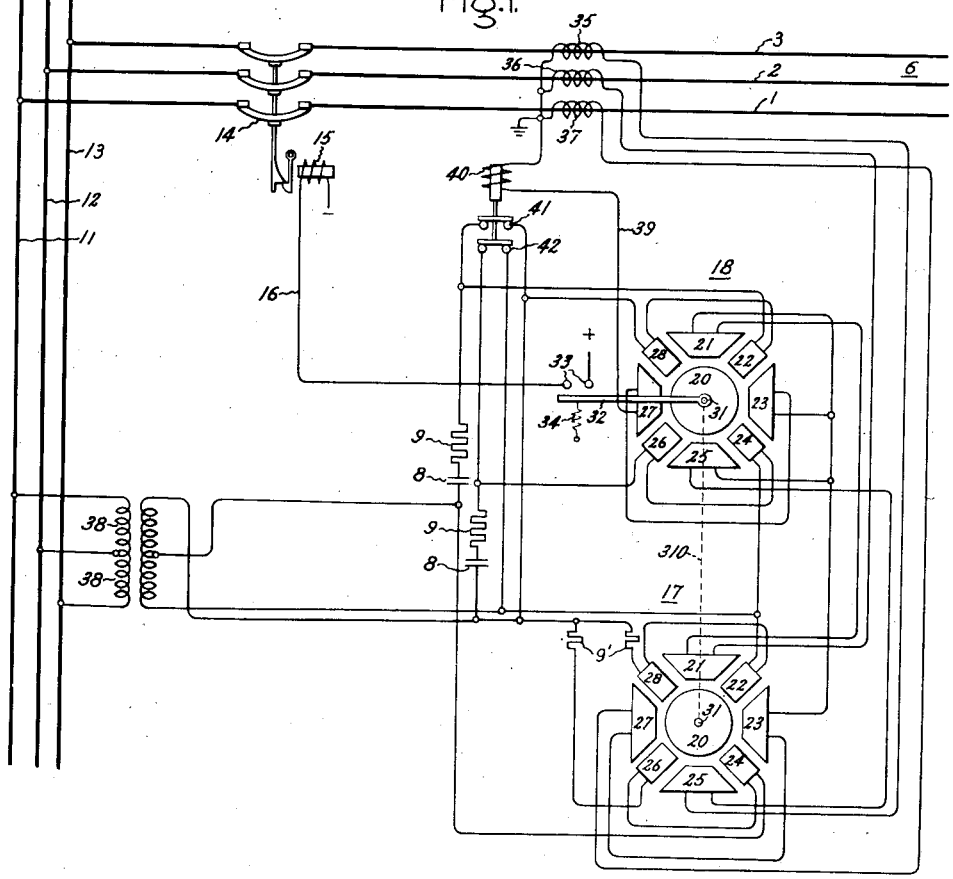

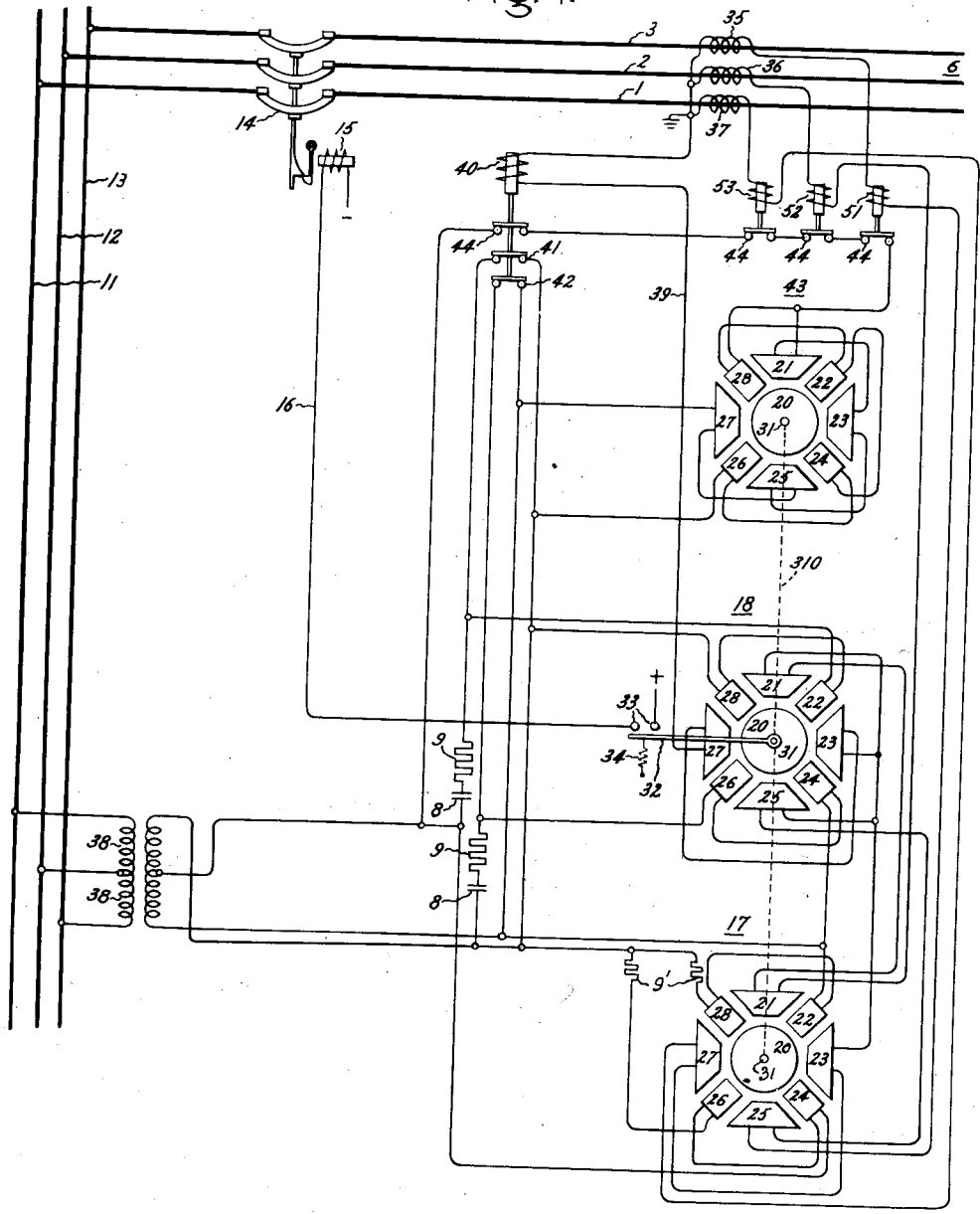

Patented May 30, 1939

2,160,599

UNITED STATES PATENT OFFICE 2,160,599

PROTECTIVE APPARATUS

Andrew J. McConnell, Upper Darby, Pa., assignor to General Electric Company, a corporation of New York

Application November 30, 1938, Serial No. 243,177

14 Claims. (Cl. 175—294)

My invention relates to improvements in protective apparatus for polyphase alternating current systems and more particularly to improvements in fault responsive protective relays which have a discriminating action dependent on the direction of flow of system power especially during faults on the system. One object of my invention is to provide improved power directional discriminating protection for polyphase alternating current systems with the minimum number of potential transformers. Another object of my invention is to provide improved directional relay apparatus which has a discriminating action dependent on the flow of fault power regardless of the kind of fault. A further object of my invention is to provide improved polyphase ground and phase fault power directional relay apparatus which responds to the direction of flow only of fault power. These and other objects of my invention will appear in more detail hereinafter.

It is customary in protective systems, which function in dependence on the direction of flow of fault power, to provide at least two power directional relays one of which responds to faults between phases and the other to faults between any phase and ground. In some cases the phase fault responsive relay is of the polyphase directional type. In other cases three separate phase fault directional relays are provided. A ground fault directional relay is usually provided regardless of the type of phase fault protection. In each case the ground fault directional relay, if used, requires polarization in dependence on the residual voltage or transformer neutral current of the circuit or system under protection. Potential polarization requires three single phase potential transformers or their equivalent instead of two, the latter number being sufficient to obtain phase-to-phase voltages. Current polarization requires a current transformer in the power transformer neutral circuit. For high voltage systems, either the extra potential transformer or the current transformer becomes an important item of cost which it is greatly desired to reduce, but this cost must not be reduced at the expense of satisfactory protection. Also, where two or more directional relays are employed, the number of contacts and leads is increased. This means more chance for something to go wrong and, accordingly, requires more maintenance and inspection. In accordance with my invention, I provide an improved fault responsive directional apparatus which requires only two single phase potential transformers or their equivalent and no polarizing current transformer and which embodies only one directional relay whose energization may be in part controlled by a device which responds to an unbalanced fault on the circuit or system. Thus, for example, the device may respond to ground current, negative phase sequence current or voltage, phase current balance, or phase voltage balance. Also, further in accordance with my invention, where directional response only to fault power is desired, a voltage dependent restraining effect, controlled in dependence on the currents or on both the currents and voltages in the different phases and also any quantity indicative of an unbalanced fault on the circuit or system under protection may be provided.

My invention will be better understood from the following description when considered in connection with the accompanying three sheets of drawings, and its scope will be pointed out in the appended claims.

In the accompanying drawings, Fig. 1 illustrates diagrammatically power directional fault responsive protective apparatus embodying my invention; Fig. 2 is a plan view partly in section and Fig. 3 a vertical sectional elevation illustrating a type of relay construction suitable for use in practicing my invention; Fig. 4 illustrates diagrammatically a modification of the embodiment of my invention shown in Fig. 1; Fig. 5 illustrates diagrammatically a modification of the embodiment of my invention shown in Fig. 4; and Fig. 6 is a phase sequence diagram.

Referring now to Fig. 1 of the drawings, a polyphase alternating current circuit, such as a three-phase power line 6, having phase conductors 1, 2 and 3 with phase sequence in that order is arranged to be connected to a station three-phase bus 11, 12, 13 by any suitable circuit interrupting means illustrated simply as a latched closed circuit breaker 14. As shown, this is provided with a trip coil 15 in an energizing circuit comprising a conductor 16. Although not shown, as it is well known to the art and forms no part of my present invention, the trip coil circuit may also include a circuit breaker "a" auxiliary switch which is closed when the circuit breaker is closed and opened when the circuit breaker opens to interrupt the highly inductive circuit of the trip coil.

For controlling the opening of the circuit breaker 14 or obtaining an indication of a fault involving the power line 6, I provide, in accordance with my invention, a power phase sequence component responsive device which has a discriminating operation dependent on the direction of flow of fault power. As shown in Fig. 1, this device comprises two cooperating elements 17 and 18, respectively responsive to different functions of the phase sequence components of the power flowing in the line 6. These elements may be of an electro-magnetic induction rotor type, one convenient form being that disclosed in United States Letters Patent 2,110,673 and 2,110,686, issued March 8, 1938, and assigned to the assignee of this invention.

As shown in Figs. 2 and 3 for purposes of illustration, each of the elements 17 and 18 is a torque-producing or motor element which comprises a hollow magnetic stator 19 having a plurality of inwardly projecting salients 191–198, inclusive, a magnetic member 19' centrally positioned relatively to and spaced from the inner ends or pole faces of the salients, a rotor 20 of electric current conducting material between the magnetic member 19' and the ends of the salients, and energizing windings such as pre-formed coils 21–28 so shaped as substantially to fill the spaces between the salients. As pointed out in the aforesaid Letters Patent 1,110,686, each motor element constitutes a unit assembly which is made self-supporting by suitable end frames 29 and 30 which are so constructed and assembled as to constitute a housing for the motor element parts. These units assemblies may be stacked vertically with the rotors of the different elements on a common shaft 31 which is suitably rotatably mounted, all as pointed out in Letters Patent 2,110,686. In Figs. 1, 4, and 5, the shaft 31 is schematically illustrated as interconnecting the rotors 20 by a dotted line 310. Secured to the shaft 31 so as to move therewith is a movable contact controlling member 32 which is arranged to control contacts 33 in the circuit of the trip coil 15 and which may be biased to the open circuit position by a spring 34.

In accordance with my invention, I so connect the coils 21–28 of the motor element 17 that this element exerts an effect, such as a torque which is dependent on a predetermined function of the phase sequence components of the power flowing in the line 6. This function may be the arithmetical sum of the positive and negative phase sequence components of the circuit power. In order to obtain such a desired effect or torque on the rotor 20 of the element 17, the coils 21, 23, 25 and 27 of the element 17 are connected to be energized in accordance with currents $I_2$, $I_1$, $I_3$ and $I_1$ respectively as derived from current transformers 35, 36, 37 respectively associated with the line conductors 3, 2 and 1, the subscripts indicating the respective phase conductors. The coils 22, 24, 26 and 28 are connected to be energized in accordance with the voltages $-E_{31}$, $+E_{12}$, $-E_{12}$, and $E_{31}$, respectively, the subscripts 31 and 12 indicating respectively the phases involving the line conductors 3 and 1, and 1 and 2. These voltages may be simply obtained by only two single phase potential transformers 38 connected in open-delta to the station bus 11, 12, 13, as shown. Suitable phase displacing means such as resistors 9' may be provided to obtain the desired angular displacement.

Further in accordance with my invention, I so connect the coils of the motor element 18 that this element exerts a torque or effect on its rotor 20 which is dependent on the arithmetical difference between the positive and negative phase sequence components of the power in the circuit 6. For this purpose the coils 21, 23, 25 and 27 are connected to be energized in accordance with the currents $I_2$, $I_r$, $I_3$, $I_r$. The subscripts 1 and 2 indicate the phase conductors 1 and 2 of the circuit 6 and $I_r$ indicates the residual current in the circuit 6 which is three times $I_0$, the zero phase sequence component of the current. Actually the turns in coils 23 and 27 are one third of the turns in coils 21 and 25 so that, although $I_r$ flows in these coils 23 and 27, the effect is as though $I_0$ flowed in them. The residual current is obtained by connecting the coils 23 and 27 in the common return lead 39 of the current transformers 35, 36 and 37. The coils 22, 24, 26 and 28 are connected to be energized in accordance with the voltages $E_{12}$, $E_{31}$, $-E_{31}$, $-E_{12}$, the subscripts 12 and 31 indicating respectively the phases involving the line conductors 1 and 2, 3 and 1. Suitable phase displacing means, such as condensers 8 and resistances 9 which may be adjustable, if desired, are provided so as to arrange the circuit constants of the element that maximum torque occurs at the desired angular displacement relative to motor element 17 and at a predetermined angular displacement between the negative phase sequence current and the negative phase sequence voltage of the circuit. This angle may be anything desired for the purpose at hand, but I have found for certain fault detection that maximum torque, when the negative phase sequence current lags the negative phase sequence voltage by approximately 50°, is satisfactory.

In order to obtain fault responsive operation for all kinds of faults with a single device, as above described, I so arrange in accordance with my invention that the element 18 is normally ineffective except on the occurrence of unbalanced faults. For this purpose I may connect in the residual lead 39 of the current transformers 35, 36 and 37 a ground fault responsive device, such as a current responsive relay 40 which is arranged through its contacts 41 and 42 normally to short-circuit the voltage responsive coils 22, 24, 26 and 28 of the relay element 18. Any other suitable device responsive to unbalanced faults, examples of which are well known to the art, may be used. With the illustrated arrangement, the element 18 exerts torque on the shaft 31 only when a ground fault occurs on the circuit 6. Consequently under all fault conditions which do not involve ground, the relay functions through the element 17 in dependence on the arithmetic sum of the positive and negative phase sequence components of the circuit power. The relay thus responds properly to all faults involving two or more phases. In case of a ground fault causing the operation of the ground current relay 40, the upper element 18 has its voltage coils 22, 24, 26 and 28 energized to exert a torque in conjunction with its current coils 21, 23, 25 and 27 dependent on the arithmetical difference between the positive and negative phase sequence components of the circuit power. Inasmuch as the elements 17 and 18 are arranged in accordance with my invention to have opposing torques under this condition with the positive phase sequence component torques balancing out, the resultant torque is dependent upon or proportional to the negative phase sequence component of the circuit power.

In order to prevent operation of the element 17 except on the occurrence of a flow of fault power in the direction for which this element should tend to effect a circuit controlling operation, I may provide, as shown in Fig. 4, means such as a third electro-magnetic torque-producing or motor element 43 which is normally effective to exert a torque which is dependent on two of the phase-to-phase voltages of the circuit 6 and which is opposed to the direction of the torque of the element 17 for power flow in a predetermined direction.

As shown, the restraining element 43 is of the same type of construction as the elements 17 and 18 and has its rotor 20 secured to the shaft 31 on which the rotors 20 of the elements 17 and 18 are mounted, the shaft again being schematically indicated by the dotted line 310. The coils 21, 23, 25 and 27 of the element 18 are energized by the phase-to-phase voltages $E_{23}$, $-E_{23}$, $E_{23}$ and $-E_{23}$ respectively and the coils 22, 24, 26 and 28 by the phase-to-phase voltages $E_{12}$, $-E_{12}$, $E_{12}$ and $-E_{12}$ respectively. The minus sign here and the plus sign understood, as elsewhere in the specification in connection with the voltages and the currents applied to the relay coils, indicate coil polarities for the correct flux direction with a given direction of coil winding. The motor element 43 thus exerts a torque which is dependent on the product of the voltages $E_{12}$ and $E_{23}$ and a function of the phase angle between them.

Inasmuch as this restraining torque is not desirable during fault conditions, I provide suitable fault detecting means, such as the ground overcurrent relay 40 and phase fault overcurrent relays 51, 52, 53, the operation of any one of which renders the restraining element 43 ineffective. For this purpose the relays 40, 51, 52 and 53 may be arranged with normally closed circuit opening contacts 44 connected in series relation in the circuit of one or both sets of the coils 21, 23, 25 and 27 and 22, 24, 26 and 28 of the element 43. Thus on the occurrence of a fault involving any one or more of the circuit phase conductors 1, 2 and 3, one or more of the relays 40, 51, 52 and 53 will operate to eliminate the restraint of the element 43 and the elements 17 and 18 will then operate as described in connection with the modification of my invention shown in Fig. 1. As will be obvious to those skilled in the art, if the relay 40 were replaced by a negative phase sequence current responsive relay, then, since such a relay would respond to all unbalanced faults, only one of the phase fault relays 51, 52, 53 would be required to remove the voltage restraint in case of balanced faults.

The embodiment of my invention shown in Fig. 5 in its general aspect is essentially the same as that shown in Fig. 4 except that the voltage restraint feature is incorporated in a motor element 17' responsive to the arithmetical sum of the positive and negative phase sequence components of the circuit power so that it is possible to have voltage restraint and yet to obtain the desired power phase sequence component response for all faults by means of only two individual electromagnetic motor elements instead of three, as shown in Fig. 4.

In order to combine the voltage restraint feature with a torque dependent on the arithmetical sum of the positive and negative phase sequence components of the circuit power, the coil arrangement and connections on the salients of the elements 17' are revised relatively to the element 17 of Fig. 1 in order to combine the two torques. Thus, for example, only the coils 21 and 25 on the salients 191 and 195 are energized by line currents, thus leaving the salients 193 and 197 available for the necessary additional voltage restraining coils 23 and 27. In this embodiment of my invention the salient 191 is energized by two coils 21' and 21'' in accordance with the difference between the currents $I_2$ and $I_1$ and the salient 195 by two coils 25', 25'' in accordance with the difference between the currents $I_3$ and $I_1$. The coils 22 and 28 are energized in accordance with the voltages $-E_{31}$ and $E_{31}$ respectively and the coils 24 and 26 by the voltages $E_{12}$ and $-E_{12}$ respectively. With this arrangement the coils 21', 21'', 22, 24, 25', 25'', 26, and 28 cooperate to provide a torque on the rotor 20 which is dependent on the arithmetical sum of the positive and negative phase sequence components of the power of the circuit 6. The coils 23 and 27 are connected to be energized in accordance with the voltages $-E_{23}$ and $E_{23}$ respectively. The coils 22, 23, 24, 26, 27, and 28 cooperate to provide torques which are dependent on the product of the voltages $E_{31}$ and $E_{23}$ and a function of the phase angle between them and on the product of the voltages $E_{12}$ and $E_{23}$ and a function of the phase angle between them. As before, these torques are opposed to the power directional torque of the element 17' for the predetermined direction of power to which this element is to respond to effect a circuit controlling action. It will be noted that in so far as the response dependent upon the arithmetical sum of the positive and negative phase sequence components of power is concerned, element 17' is the same as element 17 in Fig. 1 with the exception that $I_1$ is transferred from positions 23 and 27 to positions 21' and 25' and the polarity is reversed. In other words, the coils 21' and 25' are energized in accordance with $-I_1$. This is equivalent, in effect, to $+I_1$ in windings 23 and 27. The voltage restraint may be eliminated after the manner disclosed in connection with Fig. 4 by having contacts 44 of the ground overcurrent relay 40 and the phase overcurrent relays 51, 52, 53 connected in series in the circuit of the voltage coils 23 and 27 energized by the voltages $-E_{23}$ and $E_{23}$.

In the illustrated embodiments of my invention the elements 17, 17' and 18 have their lower frames 30 (see Fig. 3) of magnetic material as disclosed in United States Letters Patent 2,110,665, issued March 8, 1938, and assigned to the assignee of this invention.

As is well known to the art, it is usual to combine with power directional relays fault detectors, such as overcurrent relays or the like, with their contacts in series in the circuit of the trip coil of the circuit breaker. If relays embodying my invention, as shown in Fig. 1, for example, are used without switching of the relay element 18 in response to ground faults, then the fault detectors used may be either instantaneous or time relays. If relays embodying my invention, as shown in Fig. 1 with ground relay switching of the element 18, are employed, then any associated fault detector relays should have such time delay as not to respond until after energization of the element 18 in order to prevent a possible false operation of the lower element 17 on load power alone in case of ground faults. With the embodiments of my invention shown in Figs. 4 and 5, there may be associated either instantaneous or time fault detectors since the voltage restraint feature eliminates any tendency to false operation on load power flow alone even in case of ground faults.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States, is:

1. In combination with a polyphase alternating current circuit, an electroresponsive device comprising a movable member, a first means for exerting on said member an effect dependent on a function of the positive and negative phase sequence components of the circuit power and a second means adapted to exert on said member an effect dependent on a different function of the positive and negative phase sequence components of the circuit power, and means for rendering said second means effective only on the occurrence of an unbalanced fault on the circuit.

2. In combination with a polyphase alternating current circuit, an electroresponsive device comprising a movable member, a first means comprising a plurality of windings connected to be energized in accordance with certain voltages and currents of said circuit for exerting on said member an effect dependent on a predetermined function of the positive and negative phase sequence components of the circuit power and a second means comprising a plurality of windings adapted to be connected for energization in accordance with certain voltages and currents of said circuit for exerting on said member an opposing effect dependent on a different predetermined function of the positive and negative phase sequence components of the circuit power, and means for rendering said second means effective only on the occurrence of an unbalanced fault on the circuit.

3. In combination with a polyphase alternating current circuit, an electroresponsive device comprising a movable member, a first means comprising a plurality of windings connected to be energized in accordance with certain voltages and currents of the circuit for exerting on said member an effect proportional to the arithmetical sum of the positive and negative phase sequence components of the power of said circuit and a second means comprising a plurality of windings adapted to be connected for energization in accordance with certain voltages and currents including the residual current of said circuit for exerting on said member an opposing effect proportional to the arithmetical difference of the positive and negative phase sequence components of the circuit power, and means comprising a winding connected to be energized in accordance with the residual current of the circuit for rendering said second means effective only on the occurrence of a ground fault on the circuit.

4. In combination with a polyphase alternating current circuit, an electroresponsive device comprising a movable member, a first means connected to be energized for exerting on said member an effect dependent on a predetermined function of the positive and negative phase sequence components of the circuit power, a second means adapted to be connected for energization from said circuit for exerting on said member an effect dependent on a different predetermined function of the positive and negative phase sequence components of the circuit power and a third means for exerting on said member an effect opposed to the effect of said first means when the flow of circuit power is in a predetermined direction and dependent on a predetermined function of two voltages of the circuit, means for rendering said second means effective only on the occurrence of an unbalanced fault on the circuit, and means for rendering said third means ineffective under predetermined fault conditions of the circuit.

5. In combination with a polyphase alternating current circuit, an electroresponsive device comprising a rotatably mounted member and actuating means therefor comprising a first electromagnetic means for exerting on said member a torque dependent on the sum of the positive and negative phase sequence components of the circuit power and a second electromagnetic means adapted to exert on said member an opposing torque dependent on the difference between the positive and negative phase sequence components of the circuit power, and relay means connected to be energized in accordance with the zero phase sequence component of the residual current of the circuit current for rendering said second means effective only on the occurrence of a ground fault on the circuit.

6. In combination with a polyphase alternating current circuit, an electroresponsive device comprising a movable member, a first means comprising a plurality of windings connected to be energized in accordance with the currents in the phase conductors of the circuit and two of the phase-to-phase voltages of the circuit for exerting on said member an effect dependent on a predetermined function of the positive and negative phase sequence components of the circuit power and a second means comprising a plurality of windings adapted to be connected for energization in accordance with the circuit currents, the residual current of the circuit, and two of the phase-to-phase voltages of the circuit for exerting on said member an opposing effect dependent on a different predetermined function of the positive and negative phase sequence components of the circuit power, and a relay connected to be energized in accordance with the residual current of the circuit for rendering said second means effective only on the occurrence of a ground fault on the circuit.

7. In combination with a polyphase alternating current circuit, an electroresponsive device comprising a movable member, a first means comprising a plurality of windings connected to be energized in accordance with the currents in the phase conductors of the circuit and two of the phase-to-phase voltages of the circuit for exerting on said member an effect dependent on a predetermined function of the positive and negative phase sequence components of the circuit power and a second means comprising a plurality of windings adapted to be connected for energization in accordance with the circuit currents, the residual current of the circuit, and two of the phase-to-phase voltages of the circuit for exerting on said member an opposing effect dependent on a different predetermined function of the positive and negative phase sequence components of the circuit power, and a third means for exerting on said member an effect opposed to the effect of said first means when the flow of circuit power is in a predetermined direction and dependent on a predetermined function of two of the phase-to-phase voltages of the circuit, means for rendering said second means effective only on the occurrence of a ground on the circuit, and means for rendering said third means ineffective on the occurrence of a fault on the circuit.

8. In combination with a polyphase alternating current circuit, an electroresponsive device comprising a rotatably mounted electric current conducting member, a first electromagnetic means connected to be energized in accordance with the currents in the phase conductors of the circuit and two of the phase-to-phase voltages of the circuit for exerting on said member a torque dependent on the arithmetical sum of the positive and negative phase sequence components of the circuit power, and a second electromagnetic means connected to be energized in accordance with the currents of the phase conductors of the circuit, the residual current of the circuit, and two of the phase-to-phase voltages of the circuit for exerting on said member an opposing torque dependent on the arithmetical difference of the positive and negative phase sequence components of the circuit power, and relay means connected to be energized in accordance with the residual current of the circuit for rendering said second means effective only on the occurrence of a ground fault on the circuit.

9. In combination with a polyphase alternating current circuit, an electroresponsive device comprising a rotatably mounted electric current conducting member, a first electromagnetic means connected to be energized in accordance with the currents in the phase conductors of the circuit and two of the phase-to-phase voltages of the circuit for exerting on said member a torque dependent on the arithmetical sum of the positive and negative phase sequence components of the circuit power, and a second electromagnetic means connected to be energized in accordance with the currents of the phase conductors of the circuit, the residual current of the circuit, and two of the phase-to-phase voltages of the circuit for exerting on said member an opposing torque dependent on the arithmetical difference of the positive and negative phase sequence components of the circuit power, and a third electromagnetic means connected to be energized in accordance with two of the phase-to-phase voltages of the circuit for exerting on said member a torque dependent on the product of said voltages and opposed to the torque of said first electromagnetic means when the flow of circuit power is in a predetermined direction, means for rendering said second means effective only on the occurrence of a ground fault on the circuit, and means for rendering said third means ineffective on the occurrence of a ground or a phase-to-phase fault on the circuit.

10. In combination with a polyphase alternating current circuit, an electroresponsive device comprising a movable member, a first means comprising a plurality of windings connected to be energized in accordance with certain voltages and currents of said circuit for exerting on said member an effect dependent on a predetermined function of the positive and negative phase sequence components of the circuit power and a second means comprising a plurality of windings adapted to be connected for energization in accordance with certain voltages and currents including the residual current of said circuit for exerting on said member an opposing effect dependent on a different predetermined function of the positive and negative phase sequence components of the circuit power, and means connected to be energized in accordance with the residual current of the circuit for rendering said second means effective only on the occurrence of a ground fault on the circuit.

11. In combination with a polyphase alternating current circuit, an electroresponsive device comprising a movable member, a first means comprising a plurality of windings connected to be energized in accordance with the currents in the phase conductors of the circuit and two of the phase-to-phase voltages of the circuit for exerting on said member an effect dependent on a predetermined function of the positive and negative phase sequence components of the circuit power and a second means comprising a plurality of windings adapted to be connected for energization in accordance with the circuit currents, the residual current of the circuit, and two of the phase-to-phase voltages of the circuit for exerting on said member an opposing effect dependent on a different predetermined function of the positive and negative phase sequence components of the circuit power, and means for rendering said second means effective only on the occurrence of an unbalanced fault on the circuit.

12. In combination with a polyphase alternating current circuit, an electroresponsive device comprising a movable member, means for exerting on said member an effect dependent upon the difference between two different predetermined functions of the positive and negative phase sequence components of the circuit power, and means for eliminating the effect of one of said functions except on the occurrence of an unbalanced fault on the circuit.

13. In combination with a polyphase alternating current circuit, an electroresponsive device comprising a movable member, a first means for exerting on said member an effect dependent on a function of the positive and negative phase sequence components of an electric quantity of the circuit and a second means adapted to exert on said member an effect dependent on a different function of the positive and negative phase sequence components of said electric quantity, and means for rendering said second means effective only on the occurrence of an unbalanced fault on the circuit.

14. In combination with a polyphase alternating current circuit, an electroresponsive device comprising a movable member, means for exerting on said member an effect dependent upon the difference between two different predetermined functions of the positive and negative phase sequence components of an electric quantity of the circuit, and means for eliminating the effect of one of said functions except on the occurrence of an unbalanced fault on the circuit.

ANDREW J. McCONNELL.